United States Patent [19]

Hwang

[11] 4,150,208

[45] Apr. 17, 1979

[54] METHOD OF POLYMERIZING OLEFINS

[75] Inventor: Yu-Tang Hwang, Clinton, Iowa

[73] Assignee: Chemplex Company, Rolling Meadows, Ill.

[21] Appl. No.: 851,182

[22] Filed: Nov. 14, 1977

Related U.S. Application Data

[62] Division of Ser. No. 699,536, Jun. 24, 1976, Pat. No. 4,096,093.

[51] Int. Cl.$^2$ .......................... C08F 4/02; C08F 10/02
[52] U.S. Cl. ...................................... 526/96; 526/123; 526/130; 526/141; 526/154; 526/352
[58] Field of Search ................. 526/96, 124, 130, 154, 526/141, 123

[56] References Cited

U.S. PATENT DOCUMENTS

| | | | |
|---|---|---|---|
| 3,953,413 | 4/1976 | Hwang et al. | 526/96 |
| 4,041,225 | 8/1977 | Pullukat | 526/96 |
| 4,053,437 | 10/1977 | Liu et al. | 526/96 |

*Primary Examiner*—Edward J. Smith
*Attorney, Agent, or Firm*—Wegner, Stellman, McCord, Wiles & Wood

[57] ABSTRACT

A new catalyst and method of making polymers therewith and the process of preparing the catalyst in which the catalyst is prepared by dispersing on a finely divided carrier material, particularly a difficultly reducible inorganic support such as silica, a reaction product of (1) a chromium carboxylate reactant and (2) an organic nitrogen cmpound reactant capable of forming a complex such as a chelate with the chromium and activating the resulting mixture by heating at an elevated temperature in a non-oxidizing atmosphere.

15 Claims, No Drawings

METHOD OF POLYMERIZING OLEFINS

This is a division, of application Ser. No. 699,536 filed June 24, 1976, now U.S. Pat. No. 4,096,093.

CROSS REFERENCE TO RELATED PATENT & APPLICATIONS

The following patent and applications are broadly concerned with somewhat similar catalysts:

Hwang & Grimmett U.S. Pat. No. 3,953,413 covering essentially chromium chelates of beta-dicarbonyl compounds as catalyst ingredients.

Hwang & Grimmett application Ser. No. 674,450, filed Apr. 7, 1976, which discloses modifying the catalyst support of U.S. Pat. No. 3,953,413.

My copending application Ser. No. 694,780, filed June 10, 1976 which discloses and claims catalysts and methods comprising low-valent chromium surface species as an active ingredient which are derived specifically from chromium carboxylates, aminocarboxylates or nitrogen-heterocyclic carboxylates.

The above patent and applications are assigned to the assignee hereof.

BACKGROUND OF THE INVENTION

The new and improved catalysts and methods of this invention are prepared by dispersing on a finely divided and difficult to reduce inorganic oxide selected from silica, alumina, thoria, zirconia, titania, magnesia and mixtures or composites thereof a reaction product of a chromium carboxylate reactant and an organic nitrogen compound reactant capable of forming a complex such as a chelate with the chromium and activating the resulting mixture by heating to and at an elevated temperature in a non-oxidizing atmosphere with a specific temperature range being within about 850°–2000° F. These reaction products are generally complexes of the reactants and in certain specific instances classifiable as chromium chelates.

SUMMARY OF THE INVENTION

In accordance with this invention, 1-olefins of 2 to 8 carbon atoms are polymerized or copolymerized with $C_2$–$C_{20}$ 1-olefins to form solid polymers or copolymers in the presence of the catalyst of this invention which comprises essentially low-valent chromium surface species as an active ingredient dispersed and supported on at least one difficult to reduce inorganic oxide.

More uniquely, the novel catalyst is prepared by dispersing on a finely divided inorganic support of the class consisting of silica, alumina, thoria, zirconia, magnesia, titania and mixtures and composites thereof an organic chromium-bearing compound or mixture formed by chelating or complexing reactions between a chromium (III) salt or derivative of a carboxylic acid and an organic nitrogen compound that is a diamine, polyamine, heterocyclic nitrogen base with at least two nitrogen atoms not directly linked to each other, or an aromatic amine and then activating the resulting mixture by heating to and at an elevated temperature of from about 850°–2000° F. in a non-oxidizing atmosphere.

Alternately, the catalyst may be prepared by dispersing on the finely divided inorganic oxide support a carboxylate or carboxylates of the chelated or complexed trivalent chromium wherein the chelating or complexing agent is a diamine, polyamine, a heterocyclic nitrogen base containing at least two nitrogen atoms not directly linked to each other, e.g., 2,2'-bipyridine, or an aromatic amine and then activating the resulting mixture by heating to and at an elevated temperature of from about 850°–2000° F. in a non-oxidizing atmosphere.

DESCRIPTION OF THE PREFERRED EMBODIMENTS

In accordance with this invention polymerizable olefinic compounds and especially 1-olefins of 2 to 8 carbon atoms are polymerized or copolymerized with $C_2$–$C_{20}$ 1-olefins to form solid polymers and copolymers in the presence of the novel catalyst which is derived, as stated previously, from the reaction product of two types of reactants.

The first type of reactant comprises the chromium salts or derivatives of a carboxylic acid conforming to the formula

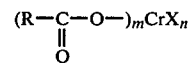

wherein R is selected from hydrogen, alkyl, alkenyl, aryl, arylalkyl, cycloalkyl and cycloalkenyl radicals and combinations of these radicals with R containing 0–30 carbon atoms and a corresponding number of valence-satisfying hydrogen atoms, m is a whole number of 1 to 3, n is a whole number of 0 to 2, m plus n is 2 or 3 and X is an inorganic or organic negative group relative to chromium such as halide, alkyl, alkoxy and the like. Typical chromium compounds of this description are chromium (III) formate, chromium (III) acetate, chromium (III) propionate, chromium (III) butyrate, chromium (III) pentanoate, chromium (III) benzoate, chromium naphthenate and chromium oleate.

The second type of reactant comprises a wide variety of organic nitrogen compounds which are capable of forming a complex such as a chelate with the trivalent chromium and are essentially of the formulas

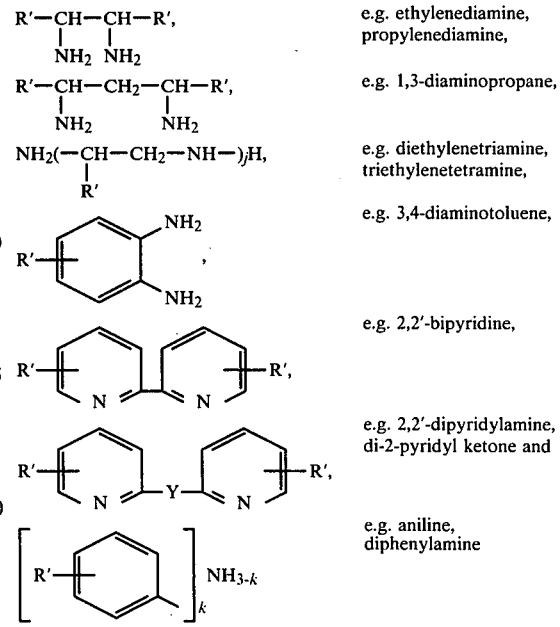

wherein each R' is individually selected from hydrogen, alkyl, alkenyl, cycloalkyl, cycloalkenyl, aryl or arylalkyl radicals and containing 0–10 carbon atoms and a corresponding number of valence-satisfying hydrogen atoms, j is a whole number of 1 to 5, k is a whole number of 1 to 3, and Y is a divalent radical such as >CO, >NH, and >CH$_2$.

One of the convenient and general methods of preparing these reaction products for use as a catalyst ingredient in this invention is to heat and evaporate to dryness an aqueous solution containing a nitrogen compound, just described, and a chromium carboxylate, previously defined, preferably at the mole ratio corresponding to their coordination stoichiometry. For example, in a system involving ethylenediamine and chromium (III) acetate, the preferred mole ratio is 3:1. Similarly, non-aqueous media may be used instead of the aqueous medium when one or both of the reactants are not soluble in water, or when the presence of water interferes with or unnecessarily complicates the formation of the desired reaction product. Under certain circumstances, a mixture of the reactants may be heated without solvent to or beyond the melting point to form a desired reaction product for use as a catalyst ingredient. In general, chelating or complexing reactions may be detected by color changes or by heat of reaction. The crude product obtained by various methods is in general further purified by a conventional method such as washing, rinsing, extracting, recrystallizing, etc.

The reaction product obtained by any of the above-mentioned methods is believed to contain generally a mixture of closely related N,N-type chelates or arylamine complexes of the trivalent chromium having various compositions which are essentially of the formula

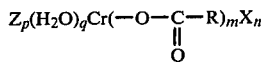

wherein Z is any of the nitrogen compounds defined earlier which are capable of chelating or complexing the trivalent chromium, p is a whole number of 1 to 3 if Z is bidentate but may be as high as 6 if Z is an arylamine, q is a whole number of 0 to 3 depending on Z, p, R and the conditions to which the reaction product is exposed, and X, R, m and n are the same as previously defined in connection with the reactants. A typical reaction product obtained by heating and evaporating to dryness an aqueous solution of ethylenediamine and chromium triacetate having the mole ratio of 3:1 appears to contain, among other things, tris(ethylenediamine) chromium triacetate, bis(ethylenediamine) chromium triacetate, bis (ethylenediamine) aquochromium triacetate, ethylenediaminediaquochromium triacetate, etc.

Logically, all or at least some of the chelated or complexed species found in said reaction product should be also suitable as catalyst ingredients in the present invention regardless of their origins or methods by which they are prepared. Among all the possible variants described in the preceding paragraph, the most suitable ones are those highly chelated by the nitrogen compound but less complexed by the water molecule and are essentially of the formula

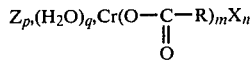

wherein Z, R and X are compounds or radicals as defined previously in connection with the reactants, p' is a whole number of 2 or 3 if Z is bidentate, e.g. ethylenediamine, but 1 or 2 if Z is tridentate, e.g. diethylenetriamine, q' is a whole number of 0 or 1, m is a whole number of 1 to 3, n is a whole number of 0 to 2, and m plus n is a whole number of 2 or 3. In the most preferred case, both q' and n are 0, p' is 3 if Z is bidentate and a typical compound in this case is tris(ethylenediamine) chromium triacetate.

CATALYST PREPARATION

In preparing a catalyst of this invention a series of steps are normally taken as follows, some being optional as indicated.

PRETREATMENT OF SUPPORT

Catalyst support, selected from silica, alumina, zirconia, thoria, magnesia, titania, or mixtures and composites thereof resulting from coprecipitation, impregnation, vapor-phase deposition, etc. may have surface areas ranging from a few m$^2$/g to over 700 m$^2$/g but preferably above 150 m$^2$/g. Pore volume is preferably in excess of 0.5 cc/g if surface area is primarily related to micropores. A finely divided non-porous support with relatively high surface area such as "Cab-O-Sil" may also be used in this invention.

Although not required, pretreatment of the support prior to its impregnation with an appropriate organic chromium compound is often preferred. Such pretreatment typically consists of adjusting the moisture content of the support by drying at elevated temperatures or chemically modifying the support with compounds containing metallic elements such as zirconium, titanium, boron, vanadium, tin, molybdenum, magnesium, hafnium or the like. Chemical modification may include adding compounds such as ammonium hexafluorosilicate which can react with the support or with the organic chromium compound during activation. Chemical modification using metal alkyls which react with the support can also be used.

The chemically modified support, especially when involving the aqueous solution impregnation, is generally calcined at elevated temperatures to fix a modifier onto the support and also to expel an excess amount of moisture, much the same way as adjusting the moisture content in the unmodified support. The calcining or drying step is normally carried out at temperatures from 300° to 2000° F. and can be done by any process known in the art such as in a muffle furnace or in a heated fluidized bed using gases such as nitrogen, air, carbon monoxide, or other suitable reactive or inert gases are fluidizing gases.

DISPERSION OF THE CHROMIUM-BEARING COMPOUND OR MIXTURE ON THE SUPPORT

The dispersion of the chromium-bearing compound or mixture on the support can be readily accomplished by a conventional impregnation method using an aqueous or organic solvent such as methanol, acetone, toluene or hexane. Equally satisfactory dispersion is often achieved by a more convenient method which calls for dry-blending of the chromium-bearing compound or mixture with the support and effecting the final dispersion during the initial stage of activation. If such a dry-blending technique is used, the subsequent activation is best carried out in the fluid bed operation. The optimum chromium content of the catalyst is dependent on the support type, surface area and pore structure. With a typical support whose surface area is 100–800 m$^2$/g and total pore volume is 0-3.0 cc/g, the chromium level may range from 0.05 to 10% with the preferred level somewhere around 0.1-2.0 weight percent on the dry basis.

THERMAL ACTIVATION OF THE CATALYST IN NON-OXIDIZING ATMOSPHERE

In accordance with this invention, the non-oxidizing atmosphere is provided either by inert gas such as nitrogen, helium, argon, etc., by reducing gas such as carbon monoxide, hydrogen, etc., or by evacuation to a sufficiently high vacuum. In the latter case, it is desirable to permit deliberate leak-in of a small amount of non-oxidizing gas. In all cases, a mixture of non-oxidizing gases may be used, if desired.

When the activation is carried out in non-oxidizing (inert or reducing) gas atmosphere, either fluid-bed or stationary-bed operation may be used. Experience, however, shows that fluid-bed operation is preferable. Normally, for economic reasons, deoxygenated nitrogen is used to fluidize the catalyst in an activator. It was experimentally established that even a minute contamination of oxygen during the activation generally has a detrimental effect on catalyst activity, and that such an adverse effect is greatly magnified when the chromium level is reduced to about 0.15% from a more typical 1 weight percent, often to the extent of completely deactivating the catalyst.

The activation step is usually carried out using a preselected heating cycle which includes heating the catalyst up to a specific temperature, usually in the range of 850°-2000° F., holding the catalyst at this temperature for a prescribed length of time, usually 30 minutes to 12 hours, followed by cooling to ambient temperature in nitrogen atmosphere. The heating cycle may also include one or more hold periods at temperatures below the maximum, as mentioned above, to permit diffusion of moisture, solvent or gaseous products from the catalyst pores, or to permit reactions such as decomposition of the surface organic chromium species to take place. The final activation temperature is usually selected on the basis of several factors, such as desired resin properties, support type, pretreatment, etc. The heat-up rate above 600° F. is generally not critical.

POLYMERIZATION PROCESSES

The novel catalysts of this invention may be used to produce polymers or copolymers in liquid-phase, solution or slurry processes or vapor-phase processes. In the liquid-phase operation, any $C_3$-$C_{12}$ saturated liquid hydrocarbon may be used as a reaction medium or diluent. Other types of solvents including aromatic hydrocarbons and chlorinated solvents may also be used. The polymerization of 1-olefins may be carried out in batch or continuous process. The catalyst is generally charged into the reaction as a slurry in the continuous process, but as dry powder in the batch process. The mode of charging the solvent and olefin to the reactor system may follow any conventional practice applicable to batch or continuous operation, respectively. A vigorous agitation of the reaction medium is of course greatly preferred and so is the provision for efficient cooling to control the reactor temperature.

In liquid-phase processes, the olefin polymer or copolymer is normally recovered by flashing off solvent without any intervening steps for removal of the catalyst. The activity of the catalysts described in this invention is normally greater than 3000 pounds of polymer per pound of catalyst so that catalyst removal is unnecessary for practical purposes. Reactor conditions are dependent on the type of olefin as well as the desired polymer properties. In the case of ethylene, reactor pressures may range from 50 to 1000 psig, temperatures from 150°-500° F. and solid levels from 5-60% by weight.

The following examples illustrate the invention.

EXAMPLE 1

The reaction product of chromium (III) acetate and ethylenediamine used in this example was prepared by the following method. 15 grams of ethylenediamine and 19 grams of chromium (III) acetate were dissolved in 30 ml and 50 ml of demineralized water, respectively. These two solutions were then mixed, heated, and evaporated to dryness. The residue was dissolved in 300 ml methanol for removal of the insolubles. Finally, the filtrate was evaporated and 29 grams of reddish brown solid was recovered.

A catalyst was prepared by the following steps:

(1) About 10 pounds of Davison MS-ID silica gel, having about 350 $m^2$/g surface area and 1.70 cc/g total pore volume, was dried in the pilot plant scale activator, essentially a 12" I.D. by 30" long cylinder equipped with a gas dispersing plate and encircling electrical heater. The actual drying was accomplished in the fluid bed maintained by 100 SCFH of air and held at 1300° F. for five hours.

(2) 30 grams of this predried silica was impregnated with a 90 ml methanol solution containing 2.4 grams of the above reaction product of chromium (III) acetate and ethylenediamine.

(3) Solvent was then evaporated off at 85°-150° F. by nitrogen sweep until the catalyst became free flowing. This drying step always followed the impregnation of the support using an organic solvent and therefore its mention will be omitted from the subsequent examples for simplicity.

(4) About 15 grams of this impregnated and partially dried catalyst was charged into a catalyst activator consisting of a 38mm O.D., 27 inch long Vycor glass tube, fitted with a fritted disc in the midsection of the tube for the purpose of fluidizing the catalyst and provided with tubular electrical heaters around the tube for adjusting the catalyst temperature. The catalyst was then fluidized with the flow of deoxygenated nitrogen, approximately 400 cc/minute, and activated according to the following heating cycle: (a) hold at 250° F. for one hour, (b) hold at 350° F. for one hour, (c) hold at 550° F. for one hour, (d) raise 200° F. every 15 minutes up to 1600° F., (e) hold at 1600° F. for 2 hours, and (f) cool down to ambient temperature in nitrogen atmosphere. The deoxygenated nitrogen that was used in this and subsequent examples was obtained by passing high purity nitrogen through a bed of reduced copper catalyst.

(5) The catalyst thus activated was transferred into a closed flask equipped with a hose-and-clamp at both openings without exposing it to air. This step was also followed in all the subsequent examples.

Evaluation of the activated catalyst for its ethylene polymerization activity was carried out in accordance with a general procedure as follows: The reactor, essentially an autoclave 5" I.D. and about 12" deep, was equipped with an agitator rotating at 560 rpm, a flush bottom valve, and three ports for charging catalyst, isobutane and ethylene, respectively. The reactor temperature was controlled by a jacket containing methanol which was kept boiling by an electrical heater encircling the jacket. The control mechanism involved the automatic adjustment of jacket pressures in response to either cooling or heating requirements.

To test a catalyst, the reactor was first thoroughly purged with ethylene at temperatures around 200° F. followed by the transfer of 0.05-0.5 g catalyst from a catalyst flask under nitrogen into the reactor via a transfer tube without exposing it to air. After the catalyst charge port was closed, 2900 ml of isobutane (dried and deoxygenated) was charged into the reactor, trapped ethylene was vented, and the reactor was allowed to warm up to 225° F. The reactor was then pressurized with ethylene which was regulated at 550 psig and which was permitted to flow into the reactor whenever the reactor pressure dropped below 550 psig. An instantaneous flow rate of ethylene was monitored by rotameters of various capacity. The duration of a test run was normally from 40 minutes to four hours depending on the polymerization rate or desired productivity.

At the end of a test run, ethylene flow was cut off, the flush bottom valve was opened, and the reactor content was dumped into a recovery pot, approximately 5" I.D. and 10" deep, where isobutane was allowed to flash off through a 200 mesh screen into the vent. Polymer particles left in the pot were recovered and weighed.

In this particular example, the activated catalyst was tested twice. The first run involved a catalyst charge of 0.2228 g, lasted for 60 minutes, and resulted in the recovery of 104 grams of polymer having the unmilled resin melt index of 0.11. The second run used a catalyst charge of 0.1830 g, was terminated after 60 minutes, and produced 80 grams of polymer whose melt index on an unmilled sample was 0.10. The resins in both runs were white to the naked eye.

EXAMPLES 2-5

The catalysts used in these examples were prepared essentially in the same manner as in Example 1 except for the final hold temperatures in the activation cycle which were 1700 and 1500° F., respectively, instead of 1600° F.

In accordance with the general procedure described in Example 1, each of these catalysts were tested and the following results were obtained.

| Ex. No. | Act. Temp. ° F. | Catalyst Charge, g | Run Time Min. | Polymer Rec'd g | React. g/g/hr | Unmilled Melt Index | Resin Color |
|---|---|---|---|---|---|---|---|
| 2 | 1700 | 0.2074 | 60 | 89 | 429 | 0.17 | White |
| 3 | 1700 | 0.1679 | 60 | 43 | 256 | 0.44 | White |
| 4 | 1500 | 0.2203 | 60 | 102 | 463 | 0.24 | White |
| 5 | 1500 | 0.1983 | 60 | 90 | 453 | 0.26 | White |

EXAMPLES 6-7

These examples illustrate the invention with the reaction product of chromium (III) pentanoate and ethylenediamine.

The reaction product of chromium (III) pentanoate and ethylenediamine that was used in these examples was prepared by mixing 19.7 grams of chromium (III) pentanoate dissolved in 70 ml acetone and 10 grams ethylenediamine dissolved in 30 ml demineralized water, heating and then concentrating by evaporation to a tacky, dark red semi-solid. After the residue was dissolved in 400 ml acetone, the insolubles were filtered off and the filtrate was once again evaporated to tacky, dark red material weighing about 15 grams. The abovementioned chromium (III) pentanoate was in turn prepared by the metathetical reaction between the intermediate sodium pentanoate and chromium trichloride as follows: 200 grams of valeric acid was first neutralized approximately to a pH of 9 using a 500 ml aqueous solution containing about 78 grams sodium hydroxide. 174 grams of chromium trichloride was dissolved in 500 ml water and then mixed with the above solution to form the precipitate. The precipitate was dissolved in 2100 ml benzene and washed in solution with a total of 1000 ml water. After filtration, the filtrate was evaporated until about 203 grams of thick, tacky, greenish-blue substance was obtained.

A catalyst was prepared by dispersing 3.1 grams of the above reaction product onto 30.0 grams of the predried 952 MS-ID silica described in Example 1 by solution impregnation using 90 ml acetone as the solvent. About 15 grams of this impregnated and partially dried catalyst was activated essentially in the same manner as in Example 1.

The catalyst thus activated was tested twice in accordance with the general procedure described in Example 1. For catalyst charges of 0.1797 (Example 6) and 0.1589 (Example 7) and a reactor run time of 60 minutes each, 117 and 88 grams of polymer were recovered in the two examples corresponding to the reactivities of 651 and 553 g/g cat/hr, respectively. The resin melt indices of the unmilled samples were 0.20 and 0.26, respectively. The resin color was relatively white in both runs.

EXAMPLE 8

This example illustrates the invention with the reaction product of chromium (III) formate and ethylenediamine.

The reaction product of chromium (III) formate and ethylenediamine used in this example was prepared by mixing two solutions, 15.7 grams of chromium (III) formate dissolved in 30 ml water and 15.0 grams of ethylenediamine dissolved in 50 ml water, heating and concentrating the resulting mixture to a tacky, red residue. After the residue was dissolved in 200 ml methanol, the insolubles were filtered off, and the filtrate was evaporated once again to a slightly tacky, red substance weighing about 16 grams.

2.2 grams of this reaction product was then dissolved in 90 ml methanol to impregnate 30.0 grams of the predried 952 MS-ID silica described in Example 1. About 20 grams of the impregnated and partially dried catalyst was then activated in the same manner as in Example 1.

According to the general test procedure described in Example 1, 92 grams of polymer was recovered after one hour with 0.2179 g of the catalyst in the polymerization. The resin melt index on an unmilled sample was 1.59.

EXAMPLES 9-10

These examples demonstrate the invention using higher homologs of ethylenediamine including in general 1,2-diaminoalkanes (e.g. propylenediamine), and 1,3-diaminoalkanes (e.g. 1,3-diaminopropane).

The reaction product of propylenediamine and chromium (III) acetate used as a catalyst ingredient in Example 9 was prepared by heating and evaporating to dryness the mixture of two solutions, one prepared by dissolving 15 grams of 1,2-diaminopropane in 30 ml water and the other by dissolving 15.5 grams of chromium (III) acetate in 50 ml water. The residue thus prepared was dissolved in 200 ml methanol. After removal of the insolubles, the filtrate was evaporated to recover 23 grams of red material.

The catalyst used in Example 9 was prepared by dispersing 2.6 grams of this reaction product onto 30.0 grams of predried 952 MS-ID silica as described in Example 1 using 90 ml of methanol as the solvent. About 15 grams of this impregnated and partially dried catalyst was then activated by the same method as in Example 1.

The reaction product of 1,3-diaminopropane and chromium (III) acetate used as a catalyst ingredient in Example 10 was prepared essentially by a similar procedure as in Example 9 except for minor differences in the amount of solvent used. About 18 grams of a slightly tacky, purple substance was recovered.

The catalyst used in Example 10 was prepared by using 2.7 grams of this reaction product and 30.0 grams of predried 952 MS-ID silica described in Example 1. The preparation procedure, including non-oxidative activation, was essentially identical to the one used in Example 9.

The two catalysts thus prepared in Examples 9 and 10 were then tested according to the general procedure described in Example 1 and the following results were obtained.

| Exam. No. | Catalyst Charge,g | Run Time Min. | Polymer Rec'd g | React. g/g/hr | Unmilled Melt Index |
|---|---|---|---|---|---|
| 9 | 0.1865 | 60 | 20 | 107 | 0.26 |
| 10 | 0.1648 | 60 | 66 | 402 | 0.72 |

EXAMPLE 11

This example further illustrates the invention by using an aromatic diamine instead of aliphatic diamines which were used in the preceding Examples.

The reaction product of 3,4-diaminotoluene and chromium (III) acetate used in this example was prepared by blending two solutions, one containing 20 grams of 3,4-diaminotoluene in 50 ml water and the other 12.5 grams of chromium (III) acetate in 50 ml water, followed by heating and evaporating the mixture to dryness. The residue was then dissolved in 200 ml acetone, and the filtrate was evaporated to yield about 25 grams of a residue of a dark brown substance.

A catalyst was prepared by impregnating 30 grams of a predried 952 MS-ID silica described in Example 1 with 90 ml of acetone solution containing 3.2 g of this reaction product. About 15 grams of the impregnated and partially dried catalyst was activated in nitrogen by the same method as in Example 1.

For a catalyst charge of 0.1887 g and run time of 60 minutes, in accordance with the general test procedure described in Example 1, 55 grams of polymer was recovered having a resin melt index (unmilled) of 1.0.

EXAMPLE 12

This example demonstrates the invention using polyamines or condensed diamines such as diethylenetriamine.

The reaction product of diethylenetriamine and chromium (III) acetate used in this example was prepared by mixing two solutions, one containing 15 grams of diethylenetriamine in 50 ml water and the other 11.1 grams of chromium (III) acetate in 40 ml water, followed by heating and evaporating the mixture to an oily, purple, glue-like residue. This residue was dissolved in 300 ml methanol and after removal of the insolubles the filtrate was again evaporated to an oily, glue-like, purple substance weighing about 18 grams.

A catalyst was prepared by dispersing 3.2 grams of this reaction product onto 30 grams of the predried 952 MS-ID silica as described in Example 1 by impregnation using 90 ml methanol as solvent. About 15 grams of the impregnated and partially dried catalyst was then activated in deoxygenated nitrogen as in Example 1 in all essential respects.

The above catalyst was tested according to the general procedure described in Example 1. 34 grams of polymer was recovered having an unmilled melt index of 0.69 over a one hour period with a catalyst charge of 0.1335 g.

EXAMPLES 13-15

These examples demonstrate the invention with the reaction product of a chromium (III) carboxylate and a heterocyclic nitrogen base capable of chelating the trivalent chromium, e.g. 2,2'-bipyridine and 2,2'-dipyridylamine.

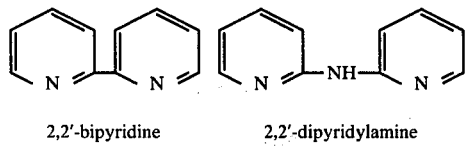

2,2'-bipyridine      2,2'-dipyridylamine

The chromium-containing reaction product used as the catalyst ingredient in Examples 13 and 14 was prepared by mixing two solutions, one containing 10 grams of 2,2'-bipyridine in 40 ml water and the other 4.9 grams of chromium (III) acetate in 30 ml water, followed by heating and concentrating the mixture to a slightly tacky residue of a brown material. This residue was dissolved in 300 ml methanol for removal of the insolubles. Upon evaporating the filtrate, about 9 grams of brown residue was obtained. 4.0 grams of this reaction product was then used to impregnate 30 grams of predried 952 MS-ID silica as described in Example 1 using 90 ml methanol as a solvent. About 15 grams of the impregnated and partially dried catalyst was then activated as in Example 1.

The chromium-containing product used as a catalyst ingredient in Example 15 was prepared by mixing two solutions, one containing 10 grams of 2,2'-dipyridylamine in 50 ml water and the other 4.5 grams of chromium acetate also in 50 ml water, followed by heating and evaporating the mixture to dryness. A violet-colored substance was leached out from the hard residue using a total of 500 ml water. After evaporating off the water, 4.6 grams of violet substance was obtained. A catalyst was then prepared by impregnating 30 grams of 952 MS-MD silica as received, without predrying, using a 90 ml aqueous solution containing 4.39 grams of the reaction product just described. The impregnated catalyst was dried in an oven at 230° F. for 2 hours and afterward at 400° F. for another 4 hours in the same oven. About 15 grams of this impregnated and dried catalyst was then activated in the same manner as in Example 1.

The catalysts of Examples 13, 14 and 15 were tested according to the general procedure described in Example 1. There were obtained the following results:

| Exam. No. | Catalyst Charge, g | Run Polymer Time Min. | Run Polymer Rec'd g | Reactivity g/g cat/hr | Resin MI (Unmilled) |
|---|---|---|---|---|---|
| 13 | 0.1752 | 60 | 59 | 334 | 0.42 |
| 14 | 0.1735 | 60 | 61 | 352 | 0.35 |
| 15 | 0.2041 | 60 | 113 | 554 | 1.06 |

EXAMPLE 16

This example demonstrates the applicability of this invention to the reaction product of an aromatic amine, e.g. aniline, and chromium (III) acetate.

The reaction product used as a catalyst ingredient in this example was prepared by blending 12.3 grams of chromium acetate, 100 ml of water and 15 grams of aniline and heating the mixture to precipitate a tacky, black substance. The precipitate was washed with 100 ml water five times and then dissolved in 200 ml acetone for removal of the insolubles. The filtrate was evaporated to a tacky, black material weighing roughly 13 grams.

A catalyst was prepared by dispersing 2.9 grams of this reaction product onto 30 grams of the predried 952 MS-ID silica described in Example 1 by solution impregnation using 90 ml acetone as the solvent. About 15 grams of this impregnated and partially dried catalyst was activated by the method used in Example 1.

A test of ethylene polymerization activity by the general method described in Example 1 indicated that the reactivity was 261 g/g catalyst/hr and the unmilled resin melt index was 0.80.

Various theories have been presented as an aid in understanding the invention. It should be understood that the invention is not limited by any of these theories.

I claim:

1. The method of making polymers of 1-olefins of 2 to 8 carbon atoms and copolymers of said olefins and 1-olefins of 2 to 20 carbon atoms which comprises polymerizing said olefins under polymerizing conditions with a catalyst prepared by dispersing on a finely divided, difficulty reducible, inorganic support of the class consisting of silica, alumina, thoria, zirconia, titania, magnesia, and mixtures and composites thereof a reaction product of (1) a chromium carboxylate essentially of the formula $$(R-\underset{\underset{O}{\|}}{C}-O-)_m CrX_n$$

wherein R is selected from hydrogen, alkyl, alkenyl, aryl, arylalkyl, cycloalkyl, and cycloalkenyl radicals and combinations of these radicals with R containing 0-30 carbon atoms and a corresponding number of valence-satisfying hydrogen atoms, m is a whole number of 1 to 3, n is a whole number of 0 to 2, m plus n is 2 or 3 and X is a negative group relative to chromium and (2) an organic nitrogen compound capable of forming a complex with trivalent chromium and essentially of the formula of the class consisting of

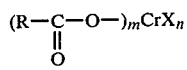

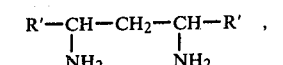

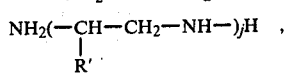

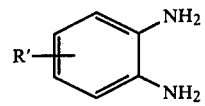

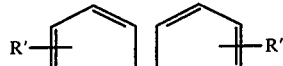

 and

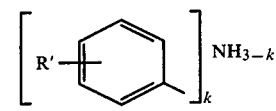

wherein each R' is individually selected from hydrogen, alkyl, alkenyl, cycloalkyl, cycloalkenyl, aryl, and arylalkyl radicals with each R' containing 0-10 carbon atoms and a corresponding number of valence-satisfying hydrogen atoms, j is a whole number of 1 to 5, k is a whole number of 1 to 3, and Y is >CO, >NH, or >CH$_2$, and activating the resulting mixture of said support and said reaction product by heating to and at an elevated temperature of from about 600°–2000° F. in a non-oxidizing atmosphere.

2. The method of claim 1 wherein said nitrogen compound is essentially of the formula

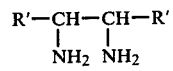

3. The method of claim 1 wherein said nitrogen compound is essentially of the formula

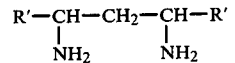

4. The method of claim 1 wherein said nitrogen compound is essentially of the formula

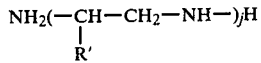

5. the method of claim 1 wherein said nitrogen compound is essentially of the formula

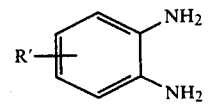

6. The method of claim 1 wherein said nitrogen compound is essentially of the formula

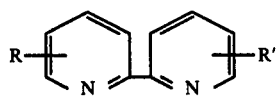

7. The method of claim 1 wherein said nitrogen compound is essentially of the formula 1

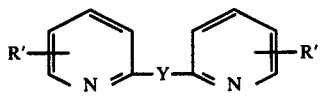

8. The method of claim 1 wherein said nitrogen compound is essentially of the formula

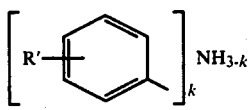

9. The method of claim 1 wherein said support prior to the addition of said reaction product is pretreated by heating at a temperature of from about 300°–2000° F. until volatile matter is at least partially driven off.

10. The method of claim 1 wherein said reaction product is dissolved in a solvent and the resulting solution used to impregnate said support.

11. The method of claim 1 wherein said dispersing of said reaction product is accomplished by dry blending with said finely divided support followed by heating in a fluid bed maintained in suspension with a non-oxidizing gas flowing through said support during said heating.

12. The method of claim 1 wherein said activating is accomplished in a fluid bed maintained in suspension with the flow of a non-oxidizing gas.

13. The method of claim 1 wherein said catalyst on a dry basis contains an amount of said reaction product to provide about 0.05–10 wt.% of chromium.

14. The method of claim 1 wherein said chromium carboxylate is a member of the class consisting of chromium (III) formate, chromium (III) acetate, chromium (III) propionate, chromium (III) butyrate, chromium (III) pentanoate, chromium (III) benzoate, chromium naphthenate and chromium oleate.

15. The method of claim 1 wherein said organic nitrogen compound is a member of the class consisting of ethylenediamine, propylenediamine, 1,3-diaminopropane, diethylenetriamine, triethylenetetramine, 3,4-diaminotoluene, 2,2'-bipyridine, 2,2'-dipyridylamine, di-2-pyridyl ketone, aniline and diphenylamine.

* * * * *